United States Patent
Mirchef et al.

(10) Patent No.: US 11,912,207 B2
(45) Date of Patent: Feb. 27, 2024

(54) VEHICLE MOUNTED TELEMATIC CAMERA

(71) Applicant: SmartWitness Holdings, Inc., Schaumburg, IL (US)

(72) Inventors: Nick Mirchef, Hoffman Estates, IL (US); Chris Pflanz, Streamwood, IL (US)

(73) Assignee: SmartWitness Holdings, Inc., Schaumburg, IL (US)

( * ) Notice: Subject to any disclaimer, the term of this patent is extended or adjusted under 35 U.S.C. 154(b) by 0 days.

(21) Appl. No.: 17/333,340

(22) Filed: May 28, 2021

(65) Prior Publication Data
US 2022/0379821 A1   Dec. 1, 2022

(51) Int. Cl.
*B60K 35/00* (2006.01)
*B60R 11/04* (2006.01)
*H04N 23/51* (2023.01)
*B60R 11/00* (2006.01)

(52) U.S. Cl.
CPC .............. *B60R 11/04* (2013.01); *H04N 23/51* (2023.01); *B60R 2011/0026* (2013.01)

(58) Field of Classification Search
CPC ............ B60R 11/04; B60R 2011/0026; H04N 5/2252
See application file for complete search history.

(56) References Cited

U.S. PATENT DOCUMENTS

| | | | |
|---|---|---|---|
| 10,955,855 B1* | 3/2021 | Tran .................... | G05D 1/0088 |
| 2002/0003571 A1* | 1/2002 | Schofield .............. | B60S 1/0885 |
| | | | 348/148 |
| 2015/0302732 A1* | 10/2015 | Wright ............. | H04N 21/42204 |
| | | | 340/5.25 |
| 2017/0129403 A1* | 5/2017 | Lavoie ................. | B62D 15/027 |
| 2018/0118116 A1* | 5/2018 | Schofield .................. | B60R 1/10 |
| 2019/0389307 A1* | 12/2019 | Plante .................... | G07C 5/085 |

FOREIGN PATENT DOCUMENTS

WO   WO-02095757 A2 *  11/2002 ............. B60R 25/00

* cited by examiner

*Primary Examiner* — Patrick E Demosky
(74) *Attorney, Agent, or Firm* — Lee & Hayes, P.C.

(57) ABSTRACT

A telematics camera includes a housing, including a plurality of sensors; a camera configured to capture an image of a scene; a communication input-output; and an input port configured to be connected in communication with an electronic engine control module of a vehicle.

20 Claims, 6 Drawing Sheets

VEHICLE MOUNTED TELEMATIC CAMERA

FIELD

This application relates generally to vehicles. More specifically, the application relates to electronic devices including a camera for installation within a vehicle, such as, but not limited to, on a windshield of a vehicle.

BACKGROUND

Vehicles can include cameras installed therein for capturing an event and/or incident (e.g., collisions, etc.). Some cameras may be capable of transmitting video, tracking, and telematics data. Improved telematic cameras are desirable.

SUMMARY

In some embodiments, a device includes a housing. The housing includes a plurality of sensors; a camera configured to capture an image of a scene; a communication input-output; and an input port. The input port is configured to be connected in communication with an electronic engine control module of a vehicle.

In some embodiments, a method includes receiving a signal from an electronic engine control module of a vehicle; in response to receiving the signal, starting recording of a camera connected in communication with the electronic engine control module; in response to an event, uploading a video recorded by the camera to an external storage device.

In some embodiments, a system includes a plurality of sensors configured to capture telematic information; a camera configured to capture an image of a scene; a communication input-output; and an input port configured to be connected in communication with an electronic engine control module of a vehicle.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Embodiments of this disclosure are directed to a telematics camera. More specifically, the telematic camera described in this disclosure is a simple, windshield-mounted camera. In some embodiments, the telematics camera is a high-definition camera. The telematics camera includes a plurality of onboard sensors (e.g., global position sensor (GPS), accelerometer (e.g., a G-Sensor)), communications capabilities (e.g., 4G/LTE, WiFi, Bluetooth®) and interfaces directly with an engine control module (ECM) of a vehicle to capture vehicle data from the onboard diagnostics of the ECM via a communications port (e.g., OBD-II port) to provide an efficient and affordable solution for vehicle owners to capture critical incident footage, driver behavior data, vehicle health and performance data, reduce road incidents/collisions, and provide an efficient and immediate (e.g., in real-time or substantially real-time) incident warning solution to a vehicle driver.

A "telematics camera," as used herein, includes a device capable of capturing an image or a stream of images. In some embodiments, the telematics camera may be a video camera configured to continuously capture a scene. In some embodiments, the telematics camera may be able to capture a discrete image, such as, for example, a frame of the stream of images.

Figure 1:
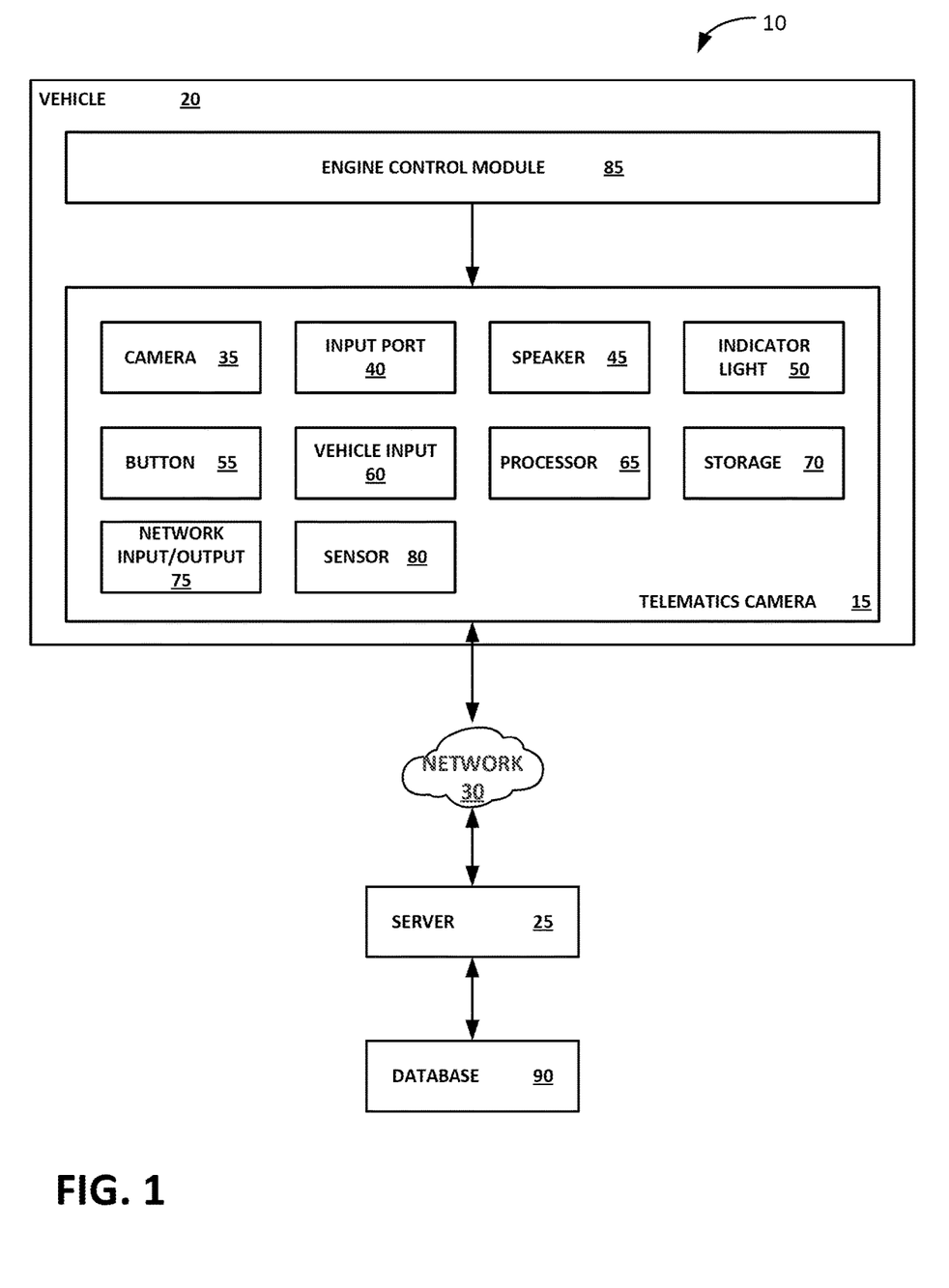
FIG. 1 is a schematic illustration of a system including a telematics camera, according to some embodiments.

FIG. 1 is a schematic illustration of a system 10 including a telematics camera 15, according to some embodiments. The telematics camera 15 can generally be configured for attachment to a windshield (e.g., of a vehicle). The system 10 can be used to receive vehicle data.

In the system 10, the telematics camera 15 can be installed in vehicle 20. The telematics camera 15 can be in communication with a server 25 via a network 30. It is to be appreciated that the illustration is an example and that the system 10 can vary in architecture. Generally, the system will include more than one telematics camera and more than one vehicle. For example, the telematics camera 15 and the vehicle 20 can be part of a commercial fleet of vehicles. Alternatively, individuals can utilize the telematics camera 15 in various vehicles.

The telematics camera 15 can be installed in the vehicle 20 such as, for example, by fixing the telematics camera 15 to a windshield of the vehicle 20.

The telematics camera 15 includes a camera 35 that is capable of capturing photographs, video, or combinations thereof. The camera 35 is capable of capturing the photographs, video, or combinations thereof in high-definition. In some embodiments, the camera 35 may capture a scene as viewed by a driver of the vehicle 20. The camera 35 can be adjustable to account for varying windshield angles in various vehicles.

The telematics camera 15 further includes an input port 40, a speaker 45, an indicator light 50, button 55, vehicle input 60, a processor 65, storage 70, network input/output 75, and sensor 80.

In some embodiments, the input port 40 can include one or more of a universal serial bus (USB) port, a nano sim port, a micro SD port, or any combination thereof. In some embodiments, the telematics camera 15 includes a USB port, a nano sim port, and a micro SD port. In some embodiments, the input port 40 can receive an appropriate device to expand a storage of the telematics camera 15. In some embodiments, the input port 40 can be used to receive an input to, for example, update firmware of the telematics camera 15. In some embodiments, the input port 40 can be used to connect multiple cameras (e.g., in a daisy chain configuration or the like).

In some embodiments, the telematics camera 15 includes the speaker 45. The speaker 45 can be used to provide audible alerts or warnings. For example, the telematics camera 15 may be able to detect drowsiness of a driver and, in response to the detection, provide an audible alert via the speaker 45 to rouse the driver.

In some embodiments, the telematics camera 15 includes the indicator light 50. The indicator light 50 can be used to provide status feedback to a user. In some embodiments, the telematics camera 15 can include a plurality of indicator lights. In some embodiments, the telematics camera 15 includes four indicator lights.

In some embodiments, the telematics camera 15 includes the button 55. The button 55 can include a plurality of buttons in some embodiments. For example, the button 55 can include a volume adjustment button, a record button, a power button, or any combination thereof. In some embodiments, for example, the volume button may adjust the volume of the audible alerts received from the speaker 45. In some embodiments, the record button, when pressed, may initiate a recording operation (i.e., saving of image data, vehicle data, etc.). For example, in case of an incident, an operator of the vehicle could press the record button to ensure that the telematics camera 15 is saving the image data received from the camera 35. In some embodiments, the telematics camera 15 can include more than one storage partition. In such an embodiment, in response to the button press, the image data, vehicle data, or any combination thereof, could be stored on a partition including a rule which prevents overwriting of the image data, vehicle data, or any combination thereof.

In some embodiments, the telematics camera 15 includes the vehicle input 60. In some embodiments, a cable can be permanently connected to the vehicle input 60. In such embodiments, the end not connected to the vehicle input 60 can include a male connector for connecting to a port on the vehicle 20. For example, the male connector can be an OBD-II type connector for connecting to an extension cable or directly to the vehicle 20. The vehicle input 60 is configured to be connected in electronic communication with an electronic control module (ECM), such as ECM 85. The ECM 85 can provide vehicle data to the telematics camera 15. In some embodiments, the ECM 85 also provides power to the telematics camera 15. As such, when the vehicle 20 is powered on (e.g., the ignition is on), the telematics camera 15 is also powered on. In some embodiments, the vehicle input 60 can be a power input only. In such embodiments, vehicle data may not be provided to the telematics camera 15, but whenever the vehicle 20 is powered, the telematics camera 15 is also powered.

In some embodiments, the telematics camera 15 includes the processor 65 and storage 70. In some embodiments, the processor 65 can be a multi-core processor, such as a quadcore processor. In some embodiments, the storage 70 can be representative of an embedded MultiMediaCard ("eMMC") storage. In some embodiments, the storage 70 can be representative of a flash-based storage media. In some embodiments, the storage 70 is a non-volatile memory. The storage 70 can receive a continuous stream of video data from the camera 35, and store the video data in the storage 70. In some embodiments, the video data can be stored for a limited period of time, then transmitted to the server 25 via the network 30. In some embodiments, the video data can be stored until the storage 70 reaches a particular capacity, then the storage 70 can transmit the video data to the server 25. In some embodiments, the particular capacity can be a maximum capacity of the storage 70. In some embodiments, the particular capacity can be less than the maximum capacity of the storage 70. In some embodiments, when the storage 70 reaches a particular capacity, the video data (oldest first) can be overwritten. In some embodiments, the storage 70 can also be used to store vehicle data such as, but not limited to, vehicle speed, engine RPM, GPS coordinates, heading, ignition status, throttle percentage, engine temperature, or any combination thereof. Similar to the video data, the vehicle data can be transmitted periodically to the server 25. In some embodiments, when the storage 70 is full, the additional data received can overwrite the prior received data.

In some embodiments, data stored on the storage 70 (vehicle data, video data, or any combination thereof), can be automatically transmitted or uploaded to the server 25 in response to an event, such as a collision, a hard brake application, a forward collision warning, a lane departure warning, driving over a speed limit, hard cornering, quick acceleration, a press of the button 55, an indication that a following distance is too short, in response to a g-sensor value exceeding a threshold, in response to a revolution per minute (RPM) exceeding a threshold, in response to a location trigger, or any combination thereof.

In some embodiments, the storage 70 can include a plurality of partitions for storing vehicle data, video data, or any combination thereof. In such embodiments, in response to an event, the vehicle data, video data, or any combination thereof can be flagged and stored in a partition that is not overwritable (e.g., for preservation of review in the future).

In some embodiments, the telematics camera 15 includes the network input/output 75. In some embodiments, the network input/output 75 is configured to transmit data via the network 30. The network input/output 75 can transmit data via the network 30 via a wireless connection using, for example, frequency bands including frequency ranges within the wireless spectrum of 2.4 GHz and 5 GHz (e.g., WiFi), a short-range wireless technology used for exchanging data between devices over relatively short distances using UHF radio waves in the ISM bands, from 2.402 GHz to 2.480 GHz (e.g., Bluetooth®), cellular, 3G, 4G, 5G, or other wireless protocol.

In some embodiments, the telematics camera 15 can include a sensor 80. The sensor 80 can include a global positioning sensor (GPS), an accelerometer or G-sensor, a gyroscope, or any combination thereof. In some embodiments, the telematics camera 15 can include multiple sensors. In some embodiments, the sensor 80 may be used to provide additional information regarding the status of the vehicle. For example, if a sudden acceleration is measured, the sensor 80 may have detected a collision. In some embodiments, the GPS can be used to provide location and or heading data.

The system 10 includes the server 25 in electronic communication with the telematics camera 15 via the network 30. The server 25 can receive combinations of video data and vehicle data from the telematics camera 15. In some embodiments, the server 25 can make the data available to a user via an electronic interface such as, but not limited to, a website, a mobile application, or the like.

In some embodiments, the network 30 can be representative of the Internet. In some embodiments, the network 30 can include a local area network (LAN), a wide area network (WAN), a wireless network, a cellular data network, combinations thereof, or the like.

In some embodiments, the server 25 may also be in electronic communication with a database 90. The database 90 can include, among other features, the vehicle data received from the telematics camera 15. In some embodiments, the database 90 can store all vehicle data received for a particular period of time (e.g., one year, one month, one week, one day, etc.). In some embodiments, the database 90 can store vehicle data in response to a problem condition (e.g., a collision or the like). It is to be appreciated that the various roles of the server 25 and the database 90 can be distributed among the devices in the system 10. For example, in some embodiments, the database 90 can be maintained on the server 25, or in some embodiments, remote from the server 25. In some embodiments, the database 90 can be cloud-based.

Figure 2A:
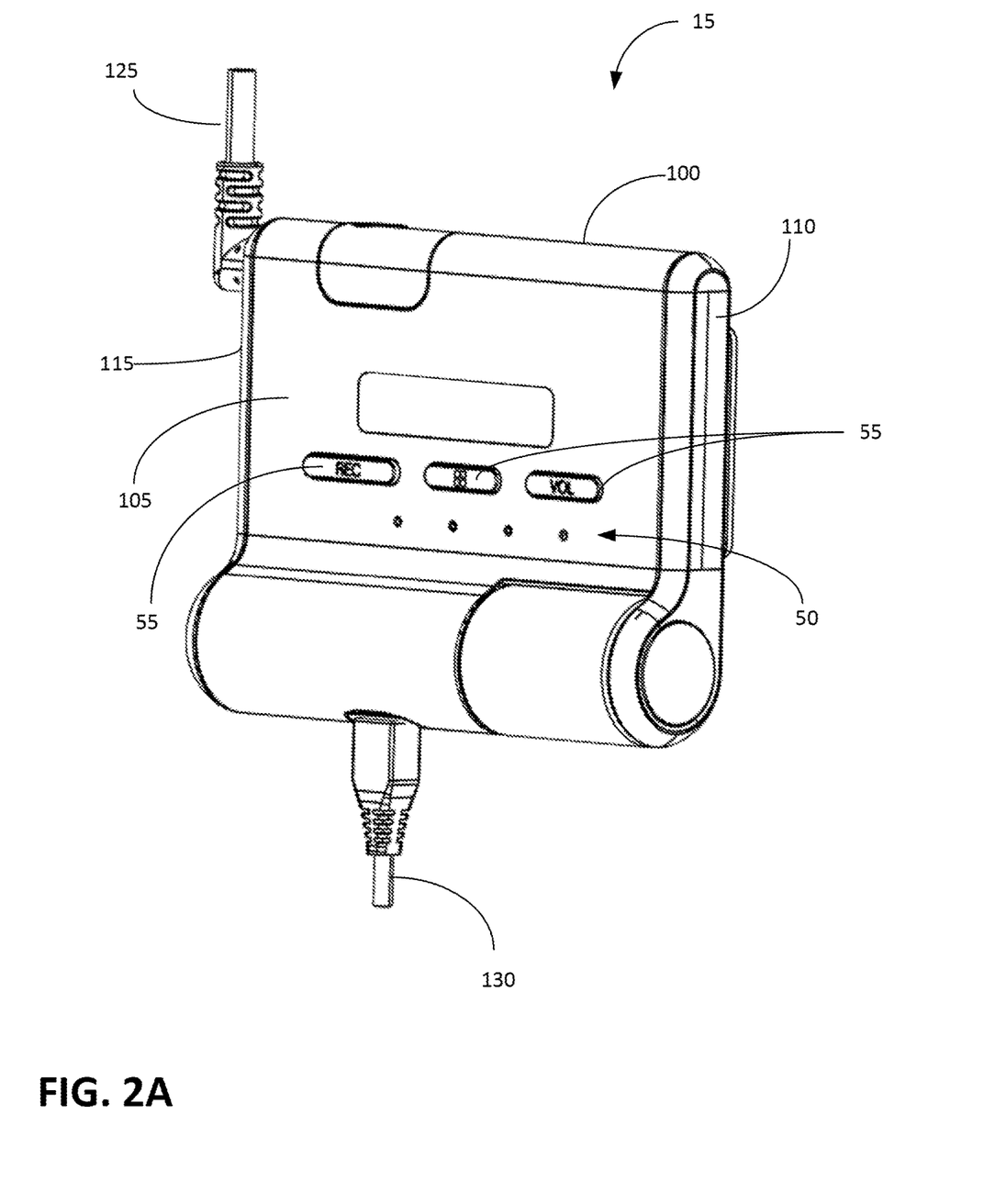
FIG. 2A shows a perspective view of the telematics camera, according to some embodiments.
Figure 2B:
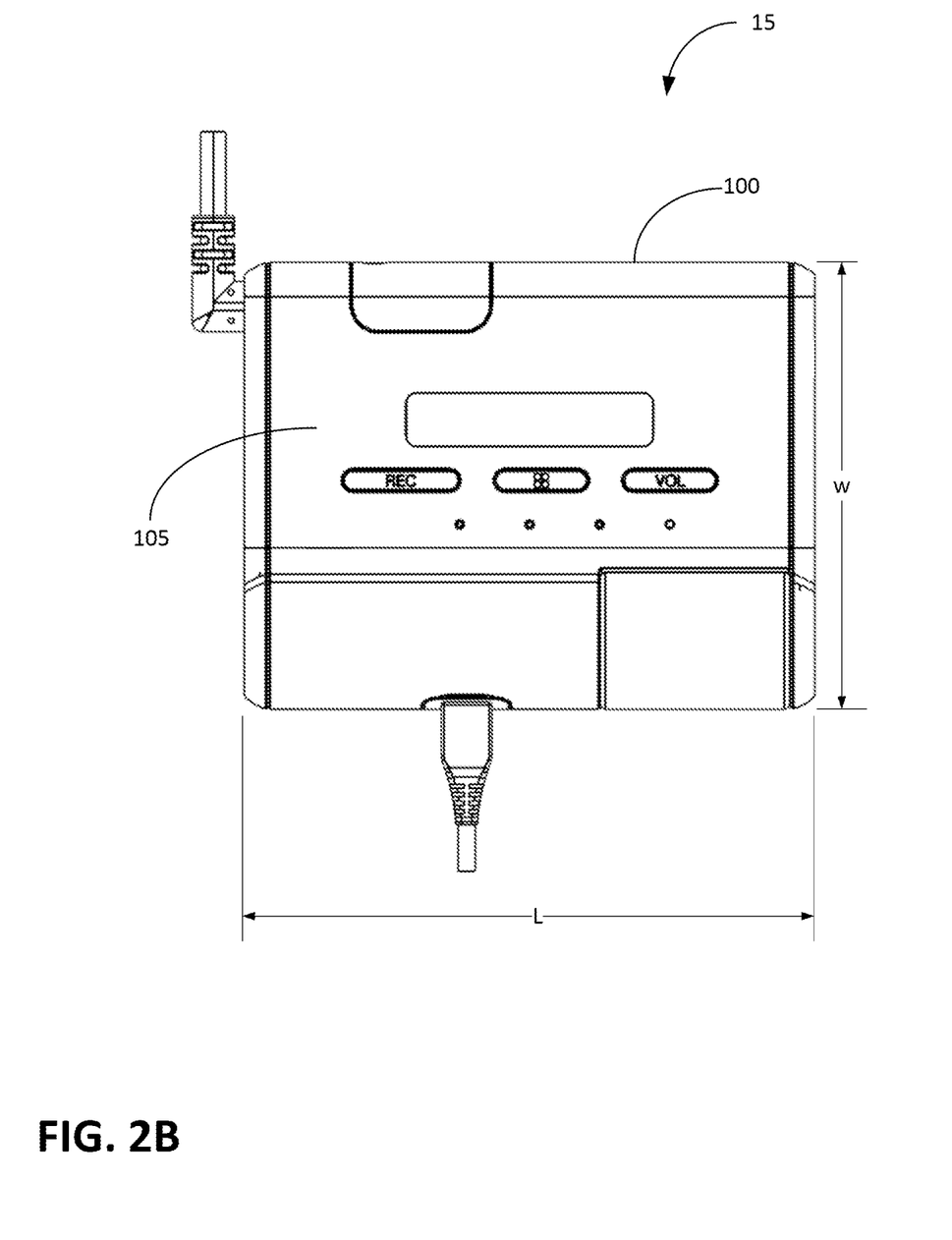
FIG. 2B shows a frontside view of the telematics camera, according to some embodiments.
Figure 2C:
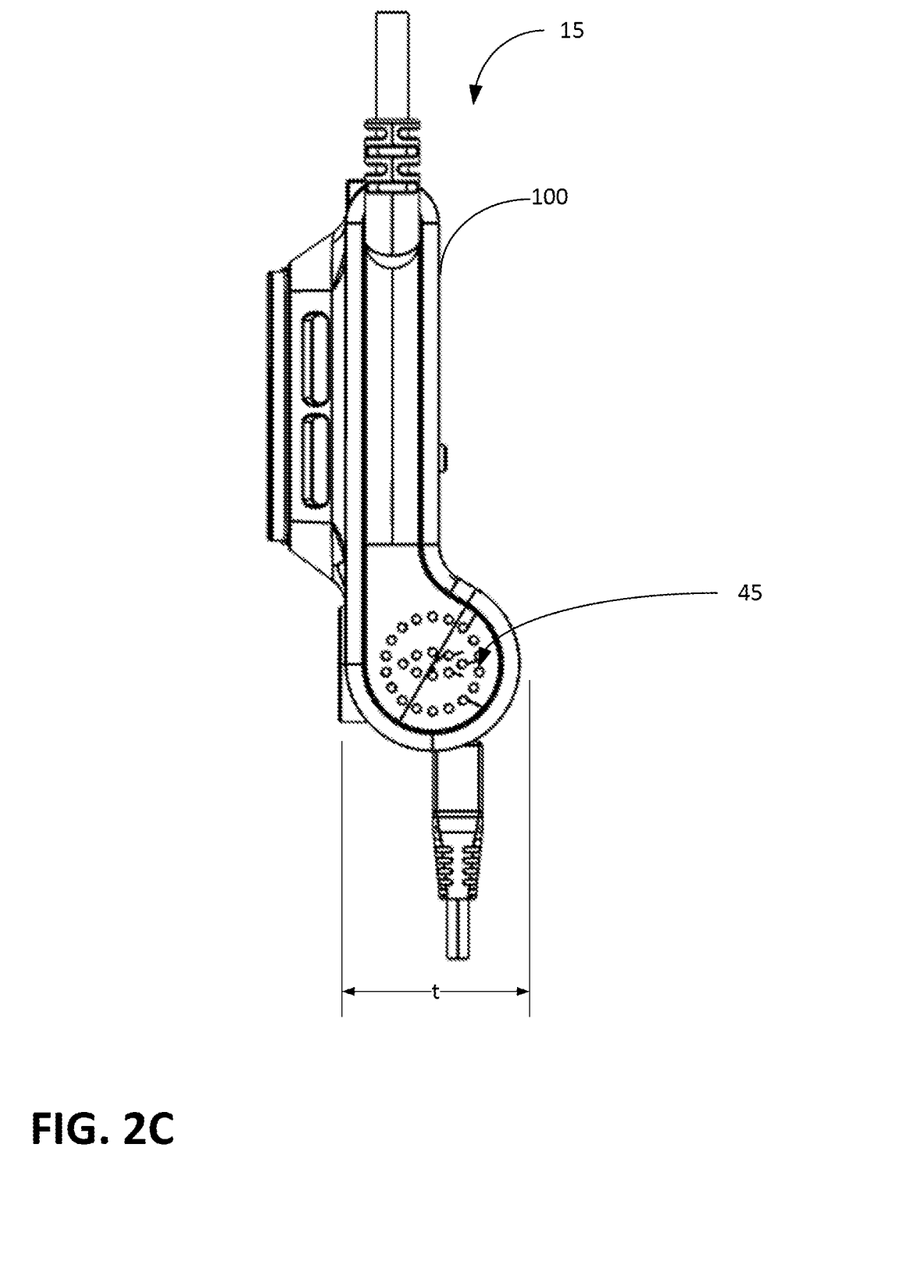
FIG. 2C shows a side view of the telematics camera, according to some embodiments.
Figure 2D:
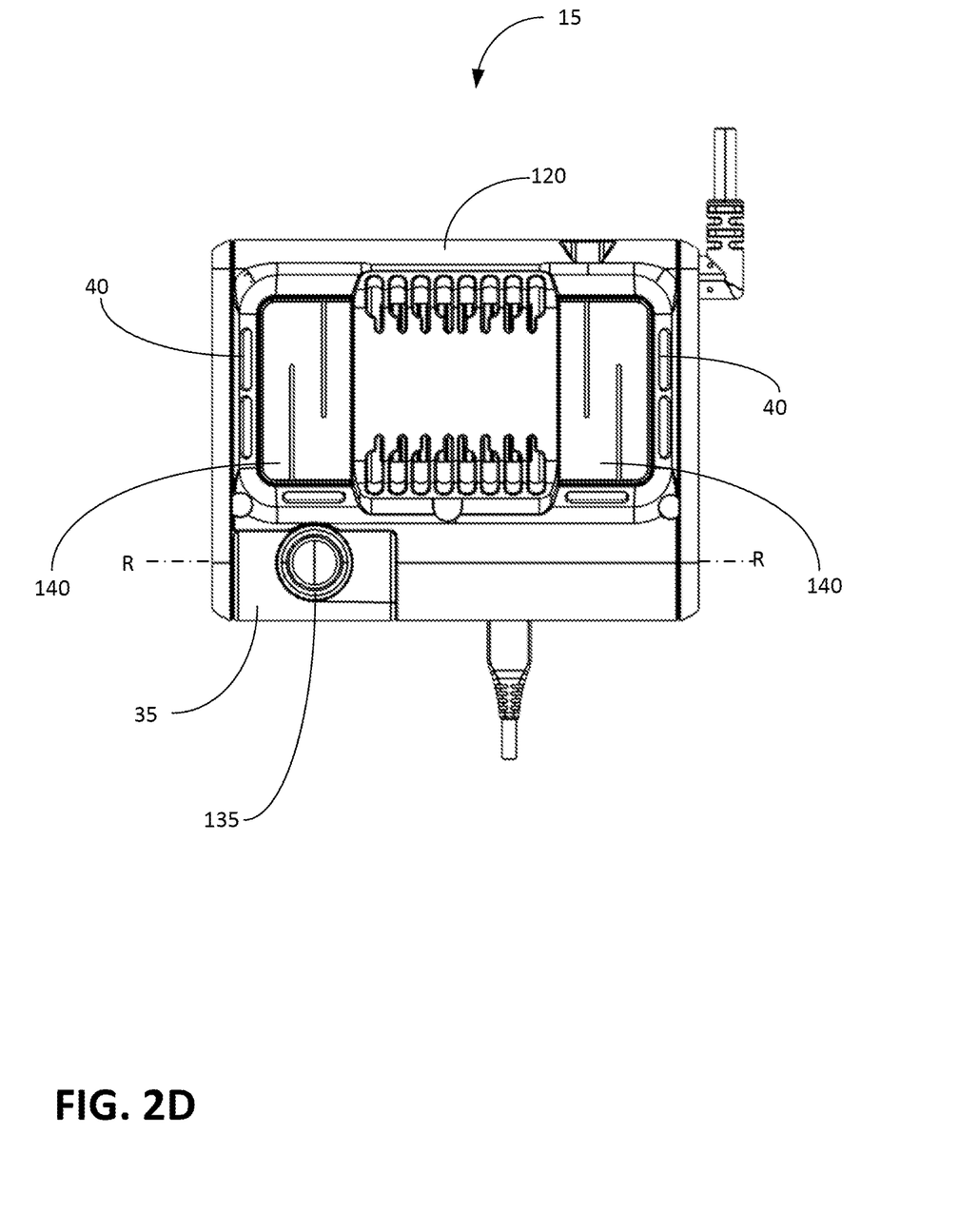
FIG. 2D shows a backside view of the telematics camera, according to some embodiments.

FIGS. 2A-2D show different views of the telematics camera 15 of FIG. 1, according to some embodiments. FIG. 2A shows a perspective view of the telematics camera 15, according to some embodiments. FIG. 2B shows a frontside view of the telematics camera 15, according to some embodiments. FIG. 2C shows a side view of the telematics camera 15, according to some embodiments. FIG. 2D shows a backside view of the telematics camera 15, according to some embodiments. FIGS. 2A-2D will be discussed generally, unless specific reference is made to a particular figure.

The telematics camera 15 includes a housing 100. A frontside 105 of the telematics camera 15 includes a plurality of the button 55 and a plurality of the indicator light 50. It is to be appreciated that the number, shape, and arrangement of the plurality of the buttons 55 and the plurality of the indicator light 50. The housing 100 includes a first side 110 and a second side 115 opposite the first side 110. A cable 125 extends from the housing 100. The cable 125 can be to provide the communication to the ECM 85 (FIG. 1) of the vehicle 20 (FIG. 1). A second cable 130 is shown in the illustrated embodiment. The second cable 130 is connected to an input port 40 of the housing 100. The second cable 130 can be optionally connectable to the telematics camera 15. The second cable 130 can be used for various purposes such as, but not limited to, debugging; configuration/calibration; data download; any combination thereof, or the like. It is to be appreciated that the second cable 130 is generally not used for normal day-to-day operation.

The housing 100 is generally designed to have a compact form factor. In some embodiments, the form factor of the housing 100 (size), can have a length L (FIG. 2B), a width w (FIG. 2B), and a thickness t (FIG. 2C). In some embodiments the length L can be from 115 mm to 130 mm. In some embodiments, the width W can be from 85 mm to 105 mm. In some embodiments, the thickness t can be from 20 mm to 40 mm. In one embodiment, the length L can be 122 mm, the width w can be 96 mm, and the thickness t can be 29 mm.

Referring specifically to FIG. 2D, the backside 120 of the housing 100 can include the camera 35 having a lens 135. The camera 35 is arranged in the housing 100 so that when the telematics camera 15 is installed on a windshield of a vehicle, the camera 35 is oriented toward a front of the vehicle (e.g., through the windshield). The housing 100 can include a protrusion 140 from the backside 120 that is configured to receive an adhesive strip to secure the telematics camera 15 to the windshield of the vehicle.

In some embodiments, the camera 35 is rotatably secured within the housing 100. An axis of rotation R may be set such that minor adjustments in the orientation of the lens 135 are possible. This can, for example, enable adjustment of the field of view to accommodate different windshield angles of different vehicles. In some embodiments, the camera 35 may be adjustable within 45° of rotation about the axis R toward the frontside 105 or 45° about the axis R toward the backside 120 of the housing 100. In some embodiments, the camera 35 may be adjustable during installation, then fixed into place to avoid unwanted movement from, for example, vibrations of the vehicle in which the telematics camera 15 is installed, driver tampering, or any combination thereof.

Figure 3:
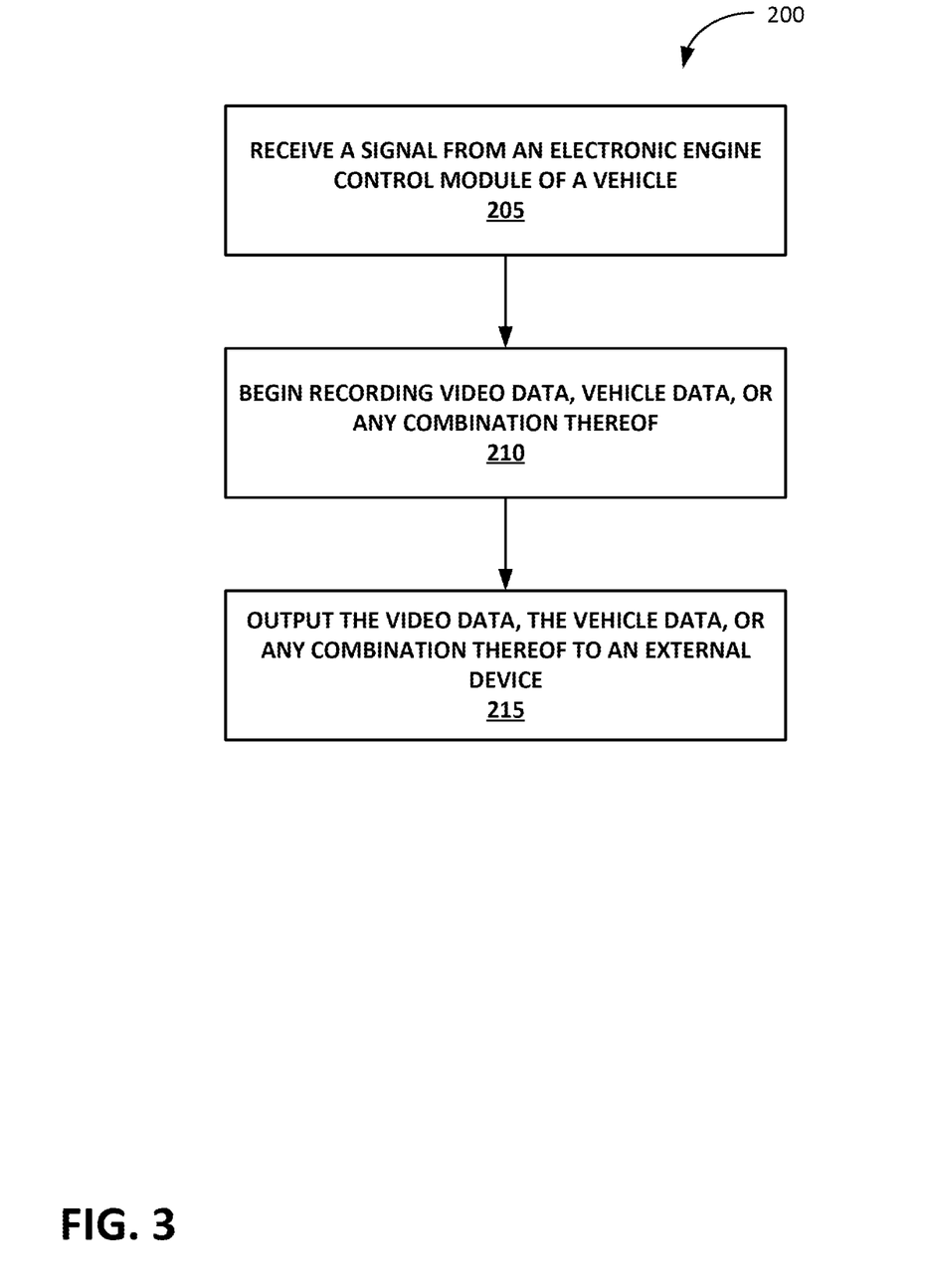
FIG. 3 shows a flowchart of a method, according to some embodiments.

FIG. 3 shows a flowchart of a method 200, according to some embodiments. The method 200 generally relates to the operation of the telematics camera 15 (FIG. 1) once installed in a vehicle 20 (FIG. 1).

At 205, the telematics camera 15 receives a signal from an electronic engine control module (ECM 85) of a vehicle 20. The signal from the ECM 85 can cause the telematics camera 15 to power on. Accordingly, in absence of the signal, the telematics camera 15 can power off. In this regard, the operation of the telematics camera 15 can be tied to an ignition status of the vehicle 20. That is, when the vehicle 20 is on, the telematics camera 15 is on. When the vehicle 20 is off, the telematics camera 15 is off.

At 210, in response to receiving the signal and powering on, a camera 35 of the telematics camera 15 begins recording. When the camera 35 is recording, the video data from the camera 35 can be stored in a storage 70 onboard the telematics camera 15. In some embodiments, when the camera 35 is recording, vehicle data is also being received from the ECM 85. Similar to the video data, the vehicle data can be stored in the storage 70.

At 215, in response to an event, the video data stored in the storage 70 can be output to an external device, such as server 25 via a network 30. In some embodiments, in addition to the video data, the vehicle data can also be output to the server 25. In some embodiments, the vehicle data but not the video data could be output to the server 25. Examples of the events at 215 can include a user-initiated event such as, but not limited to, pressing the button 55 on the telematics camera 15. In some embodiments, the events at 215 can be based on a timer so that periodically the data on the storage 70 is output to the server 25. In some embodiments, the events at 215 can include a storage threshold of the storage 70 being reached so that the storage 70 can be overlaid with additional video and vehicle data. In some embodiments, the events at 215 can be based on the vehicle data or sensors of the vehicle. For example, a collision, a hard brake application, a forward collision warning, a lane departure warning, driving over a speed limit, hard cornering, quick acceleration, or any combination thereof, as observed from the vehicle data or one or more of the sensors onboard the telematics camera 15.

In some embodiments, at 215, the output may be to a different partition of the storage (e.g., storage 70) onboard the telematics camera 15 instead of to an external device.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory such as eMMC or SD card media, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A device, comprising:
   a housing comprising a first portion and a second portion moveable relative to the first portion;
   a plurality of sensors disposed in the first portion of the housing, the first portion having a cylindrical portion including a first cylinder axis;
   a camera configured to capture an image of a scene and disposed in the second portion of the housing, the second portion of the housing having a cylindrical sidewall disposed about a second cylinder axis and a lens of the camera protruding from a portion of the cylindrical sidewall, the first portion being coupled to the second portion such that the first cylinder axis is aligned with the second cylinder axis, wherein the first portion of the housing is configured for coupling to a windshield of a vehicle and the second portion of the housing is moveable relative to the first portion, via rotation about the second cylinder axis, to adjust a rotational position of the lens to alter a field of view of the camera relative to the vehicle;
   a communication input-output; and
   an input port configured to be connected in communication with an electronic engine control module of a vehicle.

2. The device of claim 1, wherein the plurality of sensors include a global positioning sensor (GPS), a G-sensor, gyroscope, or combinations thereof.

3. The device of claim 1, wherein the communication input-output includes a cellular communication output, an output for communication in frequency bands including frequency ranges within a wireless spectrum of 2.4 GHz and 5 GHz, a short-range output for wireless technology used for exchanging data between devices over relatively short distances using UHF radio waves in ISM bands, or combinations thereof.

4. The device of claim 1, wherein the housing comprises a protrusion configured to be secured to the windshield of the vehicle.

5. The device of claim 1, wherein the housing comprises a non-volatile memory.

6. The device of claim 1, wherein the second portion of the housing is configured to pivot relative to the first portion of the housing about the second cylinder axis to configure the direction of the field of view of the camera.

7. The device of claim 1, wherein the camera is a video camera.

8. The device of claim 1, wherein the input port is configured to be connected to an onboard diagnostic port of a vehicle.

9. The device of claim 1, wherein the housing comprises a speaker, a plurality of input buttons, and a plurality of status indicators.

10. A method, comprising:
    receiving, at a device disposed in a vehicle, a signal from an electronic engine control module of the vehicle;
    in response to receiving the signal, starting recording of a camera disposed in the device, the device being connected in communication with the electronic engine control module;
    receiving, at the device and from the electronic engine control module, additional information about operation of the vehicle;
    storing the recording in first memory storage on the device;
    receiving, via a user input at a button on the device, an event identification signal; and
    in response to the event identification signal:
      identifying a portion of the recording associated with a time of the event identification signal;
      identifying a portion of the additional information associated with the portion of the recording; and
      storing the portion of the recording and the portion of the additional information in a second memory of the device, the second memory of the device being configured to prevent overwriting of the image data.

11. The method of claim 10, wherein the external storage device is a cloud-based storage device.

12. The method of claim 10, comprising storing the video recorded by the camera in a storage of the camera.

13. The method of claim 12, comprising overwriting the video as stored in response to the storage being full.

14. The method of claim 10, wherein the event identification signal is further based at least in part on a collision, a hard brake, a forward collision warning, a lane departure warning, speeding, hard cornering, quick acceleration, or combinations thereof.

15. The method of claim 10, wherein the additional information includes onboard diagnostics, G-sensor, gyroscope, vehicle speed, RPM, GPS coordinates, direction, ignition status, throttle %, engine temperature, or combinations thereof.

16. The method of claim 10, wherein the additional information includes onboard diagnostics, G-sensor, gyroscope, vehicle speed, RPM, GPS coordinates, direction, ignition status, throttle %, engine temperature, or combinations thereof.

17. A telematics camera system, comprising:
    a housing comprising a first portion, the first portion being configured for coupling to a vehicle and a second portion moveable relative to the first portion;
    a plurality of sensors disposed in the first portion of the housing and configured to capture telematic information, the first portion having a first axis;
    a camera disposed in the second portion of the housing and configured to generate image data comprising an image of a scene, the second portion of the housing having a cylindrical sidewall disposed about a second axis and a lens of the camera protruding from a portion of the cylindrical sidewall, the first portion being coupled to the second portion such that the first axis is aligned with the second axis, wherein the first portion of the housing is configured for coupling to a windshield of a vehicle and the second portion of the housing is moveable relative to the first portion, via rotation about the second axis, to adjust a rotational position of the lens to alter a field of view of the camera relative to the vehicle;

a communication input-output;

an input port configured to be connected in communication with an electronic engine control module of a vehicle;

a user interface button disposed on the first portion of the housing; and a controller configured to:
- determine, in response to a user interaction with the user interface button, an event;
- identify, based at least in part on the event, a portion of the recording associated with a time of the event;
- identify a portion of additional information received from the electronic engine control module via the input port associated with the portion of the recording; and
- at least one of uploading, via the device and to an external storage device, the portion of the recording and the portion of the additional information; or
- storing the portion of the recording and the portion of the additional information in a second memory of the device.

18. The system of claim 17, wherein the plurality of sensors include a global positioning sensor (GPS), a G-sensor, or combinations thereof.

19. The system of claim 17, wherein the camera is a video camera configured to continuously capture images of the scene.

20. The system of claim 17, wherein the input port is configured to receive power from the electronic engine control module.

* * * * *